(12) United States Patent
Tabata

(10) Patent No.: US 8,088,481 B2
(45) Date of Patent: Jan. 3, 2012

(54) PRESSURE-SENSITIVE ADHESIVE SHEET FOR TIRE

(75) Inventor: Kouji Tabata, Warabi (JP)

(73) Assignee: Lintec Corporaton, Tokyo (JP)

( * ) Notice: Subject to any disclaimer, the term of this patent is extended or adjusted under 35 U.S.C. 154(b) by 393 days.

(21) Appl. No.: 11/632,773

(22) PCT Filed: Oct. 25, 2005

(86) PCT No.: PCT/JP2005/019529
§ 371 (c)(1),
(2), (4) Date: Jan. 18, 2007

(87) PCT Pub. No.: WO2006/070529
PCT Pub. Date: Jul. 6, 2006

(65) Prior Publication Data
US 2008/0020203 A1      Jan. 24, 2008

(30) Foreign Application Priority Data

Dec. 27, 2004 (JP) ................................. 2004-375211

(51) Int. Cl.
*B32B 7/12* (2006.01)
(52) U.S. Cl. ....... 428/343; 428/40.1; 428/344; 428/354; 428/355 BL; 428/355 N
(58) Field of Classification Search ................. 428/40.1, 428/343, 344, 346, 354, 355 R, 355 BL, 355 EN
See application file for complete search history.

(56) References Cited

U.S. PATENT DOCUMENTS

| 5,095,059 A | * | 3/1992 | Kitamura et al. ............. 524/272 |
| 5,120,781 A | | 6/1992 | Johnson, Jr. |
| 5,292,806 A | * | 3/1994 | Diehl et al. ..................... 525/89 |
| 5,403,658 A | * | 4/1995 | Southwick et al. ..... 428/355 BL |
| 5,750,623 A | * | 5/1998 | Diehl et al. ..................... 525/98 |
| 7,618,705 B2 | * | 11/2009 | Tabata et al. ............ 428/355 BL |
| 2004/0007322 A1 | | 1/2004 | Lechat et al. |

FOREIGN PATENT DOCUMENTS

| JP | S63-280784 | 11/1988 |
| JP | 07-268311 A | 10/1995 |
| JP | H10-147757 | 6/1998 |
| JP | 11-080690 A | 3/1999 |
| JP | H11 080690 A | 3/1999 |

(Continued)

OTHER PUBLICATIONS

ExxonMobil Chemical, Product Data Sheet, ESCOREZ 5300 Series, Dec. 2006.*

(Continued)

*Primary Examiner* — Jennifer McNeil
*Assistant Examiner* — Cheng Huang
(74) *Attorney, Agent, or Firm* — Manabu Kanesaka

(57) ABSTRACT

A tire adhesive sheet having a high adhesive strength to a tire at a wide temperature range and a good tackiness even to a studless tire is provided. The tire adhesive sheet contains a base material and an adhesive layer. The adhesive layer contains a hot-melt type adhesive composition and is constructed to satisfy adhesion characteristics of:
(A) an adhesive strength of 7 N/25 mm or more with respect to a SBR plate at 5° C.; and
(B) an adhesive strength of 7 N/25 mm or more with respect to a SBR plate at 40° C.

5 Claims, 4 Drawing Sheets

FOREIGN PATENT DOCUMENTS

| | | |
|---|---|---|
| JP | 2000-204334 A | 7/2000 |
| WO | WO 96/11236 | 4/1996 |
| WO | WO 96/27644 | 9/1996 |
| WO | WO 02/00805 A | 1/2002 |
| WO | WO2005/037945 * | 4/2005 |

OTHER PUBLICATIONS

Sonneborn, Product Data Sheet, KAYDOL White Mineral Oil, Oct. 2008.*

Gent, Alan N. (2001). Engineering with Rubber—How to Design Rubber Components (2nd edition). (pp. 29). Hanser Publishers. Online version available at: http://knovel.com/web/portal/browse/display?_EXT_KNOVEL_DISPLAY_bookid=981&VerticalID=0.*

FTM 9, Finat Test Method No. 9; "Loop Tack Measurement" finat technical handbook $6^{th}$ edition, 2001.

Secchaku, Asahi Melt; Ashi Kagaku Gousei Kabushiki Kaisha.

"Hotmelt Secchaku No Jissai" by Hiroshi Fukada, published on May 20, 1979, Fifth Edition, published on Mar. 20, 1987, pp. 66-73.

* cited by examiner

PRESSURE-SENSITIVE ADHESIVE SHEET FOR TIRE

TECHNICAL FIELD

The present invention relates to a pressure-sensitive adhesive sheet for a tire (hereinafter, also referred to as "tire adhesive sheet). More specifically, the present invention relates to an adhesive sheet for a tire, which has a high adhesive strength to the tire at a wide temperature range and having good adhesion strength even to a studless tire.

BACKGROUND TECHNOLOGY

Conventionally, tire adhesive sheets also called as tire indicative labels or the like have been known in the art. The adhesive sheet has a tire-indicating part that represents a tire maker's name, brand name, dimensions (width, flatness, and rim ratio), instruction for use, and so on, which can be used such that it is stuck on the periphery of the tire including a tread surface. In other words, generally, the adhesive sheet for a tire has a film having an aluminum deposited layer, which is provided as a support. Thus, the adhesive layer is comprised of an adhesive layer mainly containing a rubber resin or an acrylic alkyl ester resin, which is laminated on the support.

In addition, there is disclosed a tire adhesive sheet that employs a white film as a surface base material, which is made of a biaxial-stretching film and comprised of three or more layers consisting mainly of polypropylene and having voids therein and includes an adhesive layer having a predetermined adhesive strength and consisting mainly of a cross-linking product of an alkyl acrylate ester resin (see, for example, Patent Document 1). More concretely, it is a tire adhesive sheet having an adhesive strength to a tire (in accordance with JIS Z 0237) of 500 to 1,500 g/25 mm.

Furthermore, there is disclosed a tire adhesive sheet having a surface base material and an adhesive layer, wherein the adhesive layer is prepared by mixing 100 parts by weight of an acryl resin containing alkyl acrylate ester as a principal monomer and having a grass transition point of −60 to −30° C. with 3 to 45 parts by weight of a liquefied tackifier resin and cross-linking with a cross-linking agent (see, for example, Patent Document 2).

In addition, there is disclosed a tire adhesive sheet comprising an anchor coat layer, a vinylidene chloride/vinyl chloride copolymer layer, and an adhesive layer having a predetermined adhesive strength on the surface of a polypropylene film containing a white pigment (see, for example, Patent Document 3). More concretely, it is a tire adhesive sheet having an adhesive strength of 1,000 to 2,700 g/25 mm against a polyethylene board (in accordance with JIS Z 0237).

Furthermore, there is disclosed a tire adhesive sheet comprising an adhesive layer composed of predetermined amounts of natural rubber, an ABA type block copolymer, a tackifier (see, for example, Patent Document 4).

[Patent Document 1] JP-A-10-147757
[Patent Document 2] JP-A-2000-319618
[Patent Document 3] JP-A-2002-294187
[Patent Document 4] JP-A-11-80690

DISCLOSURE OF THE INVENTION

Problems to be Solved by the Invention

However, remarkable irregularities are formed in the tread surface of a tire. In addition, there are fibrous projections referred to as "spews", which may be formed due to an air vent aperture in a metal mold used upon tire molding. Therefore, it has been difficult to adhere a tire adhesive sheet disclosed in Patent Documents 1 to 4 with high dimensional accuracy.

In addition, metal-mold releasing agent used in the production of a tire could be transferred and maintained in not a little amount. Therefore, problems that the tire adhesive sheet once attached on the tire would tend to fall of upon storage or in shipment of the tire has been also observed. Especially, during the winter season, for example at a decreased outdoor temperature of about 5° C., the adhesive sheet would tend to fall off due to a decrease in adhesive characteristics.

In addition, when a studless tire was used as a substrate, the tire adhesive sheet disclosed in any of Patent Documents 1 to 4 has poor adhesion strength as the surface of the tire had an unusual irregular structure or was combined with a specific additive. Therefore, the adhesive sheet would tend to fall off upon storage or in shipment of the tire.

Any of tire adhesive sheets disclosed in Patent Document Nos. 1 to 4 intend to be subjected to the step of application using a solvent when an adhesive layer is applied thereon and then to the step of drying to remove the solvent. However, troubles have been observed in that the production process was enlarged, the production time period was prolonged, and consideration for environmental issues was lacked. In particular, the tire adhesive sheet disclosed in Patent Document 3, even at least a part thereof, has been provided with a vinylidene chloride—vinyl chloride copolymer later, so that an environmental problem of tendency to release dioxin upon incineration.

As a result of concentrated study, the present inventors have found that, by means of the adhesive sheet that uses a hot-melt type adhesive composition having specific adhesion characteristics, even in summer or in winter, or even in spite of the type of a tire, pealing of the adhesive sheet from the tire upon storage or in shipment of the tire can be effectively settled.

In other words, the present invention intends to provide an adhesive sheet for a tire, which has a high adhesive strength to the tire at a wide temperature range and having good adhesion strength even to a studless tire.

Means for Solving the Problems

According to the present invention, the aforementioned problems can be resolved by providing an adhesive sheet for a tire, characterized by comprising a base material and an adhesive layer, wherein the adhesive layer contains a hot-melt type adhesive composition, while satisfying adhesion characteristics of:

(A) an adhesive strength of 7 N/25 mm or more with respect to a SBR plate at 5° C.; and (B) an adhesive strength of 7 N/25 mm or more with respect to a SBR plate at 40° C.

Here, the reason for controlling the adhesive strength to the SBR plate at 5° C. within a predetermined range is to represent a high adhesive strength to the tire and for a cross relationship with no loose or falling off occurred after adhering on even at low temperatures in winter. In addition, the reason for controlling the adhesive strength to the SBR plate at 40° C. within a predetermined range is to represent a sufficient adhesive strength to the tire and for a cross relationship with no loose or falling off occurred after adhering on even at high temperatures in summer.

In other words, by satisfying the conditions of (A) and (B), the tire adhesive sheet available at a wide temperature range including 5° C. and 40° C. and available even for a studless tire.

In addition, when the adhesive strength to the SBR plate at each of 5° C. and 40° C. is measured, the method described in Example 1 can be adapted.

Furthermore, for constructing the tire adhesive sheet of the present invention, a tackifier included in the hot-melt type adhesive composition is preferably a polymerized rosin ester.

That is, by the use of polymerized rosin ester, the adhesive strength or cohesive strength of the hot-melt type adhesive composition can be easily controlled further at a wide temperature range.

Here, the term "polymerized rosin ester" is defined as an ester compound which can be obtained by reacting polymerized rosin obtained by polymerization of gum rosin with polyalcohol. In addition, upon polymerization of polymerized rosin, an ester compound, which can be obtained by reacting polyalcohol with denatured polymerized rosin obtained by the addition of a compound containing a carboxyl group, such as a (meth)acrylic acid compound or a phthalic acid compound, is also included.

For constructing the tire adhesive sheet of the present invention, preferably, the tackifier is a combination of: at least one selected from aromatic denatured terpene resins, terpene phenol resins, aliphatic petroleum resins, aliphatic/aromatic copolymer petroleum resins, and rosin resins except of polymerized rosin ester; and polymerized rosin ester.

In other words, by combining with the predetermined tackifier, the polymerized rosin ester, which can be easily compatibilized with the resin portion in the block copolymer, can be selectively compatibilized in a rubber portion. Therefore, the adhesive strength or cohesive strength of the hot-melt type adhesive composition can be more easily controlled.

Furthermore, for constructing the tire adhesive sheet of the present invention, when the tire adhesive sheet is stuck on a round bar made of polyethylene (10 mm in diameter) and then left standing for seven days under standard conditions (23±2° C. at temperature and 50±5% in relative humidity), it is preferable that the total length of loose may be below 5 mm.

In other words, by confining the total loose length within a predetermined range, the tire adhesive sheet can exert a sufficient adhesive strength to the tire even in summer or winter to prevent the sheet from loose or falling off after adhering on the tire.

Furthermore, for constructing the tire adhesive sheet of the present invention, the retention of the hot-melt type adhesive composition is preferably in the range of 1,000 to 20,000 seconds by a measuring method in accordance with JIS Z 0237.

In other words, by confining the retention of the hot-melt type adhesive composition within a predetermined range, even in summer or winter, sufficient retention can be exerted to prevent the sheet from loose or falling off after adhering on the tire.

Furthermore, for constructing the tire adhesive sheet of the present invention, it is preferable that the hot-melt type adhesive composition mainly comprises:
(C) 15 to 45% by weight of a block copolymer;
(D) 30 to 70% by weight of a plurality of tackifiers with different softening points; and
(E) 10 to 40% by weight of a plasticizer, as well as
(D) at least one of at least one tackifier having a softening point of 60 to 100° C. measured in accordance with JIS K 2207 and at least one tackifier having a softening point of 120° C. or more.

That is, at a predetermined mixing ratio, by the use of the block copolymer, a plurality of tackifiers having different melting points, and the plasticizer, the adjustment of an adhesive strength or cohesive strength of the hot-melt type adhesive composition can be more easily controlled.

For constructing the tire adhesive sheet of the present invention, a block copolymer included in the hot-melt type adhesive composition is a mixture of a styrene/isoprene/styrene block copolymer (SIS) as an ABA type block copolymer and a styrene/isoprene block copolymer (SI) as an AB type block copolymer. It is preferable that the amount of the AB type block copolymer added may be in the range of 30 to 80% by weight.

In other words, by combining the predetermined ABA type block copolymer with the AB type block copolymer at a predetermined volume ratio, sufficient retention can be exerted even in summer or winter to prevent the sheet from loose or falling off after adhering on the tire.

Furthermore, for constructing the tire adhesive sheet of the present invention, the content of a polystyrene domain in 100% by weight of the block copolymer may be preferably adjusted to 20% by weight or less.

In other words, by optimizing the content of the polystyrene domain in the block copolymer, the adhesive strength and cohesive strength of the hot-melt type adhesive composition can be further controlled more easily.

Furthermore, for constructing the tire adhesive sheet of the present invention, the plasticizer may be preferably a paraffin-based process oil.

In other words, the use of a predetermined compound as a plasticizer allows the hot-melt type adhesive composition to have an excellent color hue while being stable particularly to heat and UV.

Furthermore, for constructing the tire adhesive sheet of the present invention, it is preferable to place a metal layer between the base material and the adhesive layer.

In other words, through the adhesive layer, the movement of any constituent of the tire can be blocked to effectively prevent the surface of the base material from blackening.

BEST MODES FOR CARRYING OUT THE INVENTION

First Embodiment

As is exemplified in each of FIGS. 1(a) to (d), a first embodiment of the invention is each of tire adhesive sheets 1 and 2, which comprises a base material 10 and an adhesive layer 11. Here, the adhesive layer 11 contains a hot-melt type adhesive composition, so that the tire adhesive sheet can be characterized by satisfying both the following adhesion characteristics (A) and (B) can be provided, thereby resolving the foregoing problems:
(A) an adhesive strength of 7 N/25 mm or more with respect to a SBR plate at 5° C.; and
(B) an adhesive strength of 7 N/25 mm or more with respect to a SBR plate at 40° C.

Furthermore, each of the tire adhesive sheets 1 and 2 exemplified in FIGS. 1(a) to (d) is schematically illustrated in cross section such that a release film 12 is provided on the surface of the adhesive layer 11.

1. Base Material

(1) Kinds

For kinds and configurations of the base material (substrate) 10 that constitutes part of the part of the tire adhesive sheet exemplified in each of FIGS. 1(a) to (b), but not specifically limited to, those of plastic films or paper, artificial paper having voids therein, or the like, which are known in the art, can be used.

Among them, however, a plastic film or artificial paper is further preferable because of being excellent in mechanical strength and capable of effectively avoiding the base material from destruction upon falling off. Examples of the plastic sheet include polyethylene, polypropylene, polyethylene terephthalate, polyester, polystyrene, and nylon films. In addition, examples of the artificial paper include single- or double-layered synthetic paper having voids therein, formed into a film by extrusion after melt-blending a synthetic resin with a filler and an additive agent.

In terms of the configuration of the base material, as shown in FIG. 1(b), the tire adhesive sheet 2 using the base material 10 provided with a metal layer 13, such as an aluminum deposited layer, is preferable. This is because, by placing the metal layer 13 between the base material 10 and the adhesive layer 11, the surface of the base material can be effectively prevented from blackening due to the movement of any constituent of the tire. More concretely, it is because that, even the constituents, such as an amino-based anti-aging agent and an aromatic oil, of a rubber material that constitutes the tire may move to the base material and cause blackening of the surface of the base material, such a movement can be blocked by the presence of the metal layer 13.

Furthermore, in terms of the configuration of the base material, it is preferable to form a readily-biding layer 14 as shown in FIG. 1(C) to facilitate the formation of a print layer 15 or to form a recording layer 16 for allowing recording, such as thermal imprint recording or inkjet recording, as shown in FIG. 1(d), or to carry out over-coating or over-lamination to protect these surfaces.

Furthermore, it is also preferable that part of the base material 10 may be provided with an information area (not shown) of any of magnetic recording, bar-codes, semiconductor micro-elements, and the like.

(2) Thickness

The base material may preferably have a thickness of 10 to 150 μm because of the follows: If the thickness of the base material is below 10 μm, it may be difficult to handling, or the base material may become creased upon adhering or broken down upon falling off. On the other hand, if the thickness of the base material exceeds 150 μm, accompanying with a decrease in flexibility, the adhesive sheet tends to fall off of the tire as the ability of tire adhesive tape decreases. Furthermore, it is more preferable that the base material may have a thickness of 10 to 120 μm.

2. Adhesive Layer

(1) Kinds

(1)-1 Main Component

Variations of the hot-melt type adhesive composition that constitutes the adhesive are not specifically limited as far as they have adhesive strength to a predetermined SBR plate. For instance, any of natural rubber, synthetic rubber, acrylic, urethane, and silicon adhesives conventionally known in the art can be used. Among them, however, the synthetic rubber adhesive may be preferably used. Examples of the synthetic rubber adhesives include: ABA-type block copolymers such as a styrene/isobutylene/styrene block copolymer (SIBS), a styrene/butadiene/styrene block copolymer, and a styrene/isoprene/styrene block copolymer (SIS).

Here, the term "ABS-type block copolymer" represents a copolymer prepared by block polymerization of two different single polymers, constituent A and constituent B. If the constituent A is a resin constituent and the B constituent is a rubber constituent, the opposite ends of the rubber constituent (constituent B) are configured as being restrained by the domain of the resin constituent (constituent A).

The styrene/isoprene/styrene block copolymer (SIS) may be preferably used as the ABA-type block copolymer because it can be easily provided with a tack function while the adhesive strength thereof to a SBR plate at low temperatures can be controlled further easily.

These synthetic rubber adhesives may be blended with a tackifier, a plasticizer, or an additive agent to control the adhesive strength or retention thereof.

The synthetic rubber adhesive, particularly preferably used in the present invention, can be a hot-melt type composition having the following composition:

(C) 15 to 40% by weight of a block copolymer;
(D) 30 to 70% by weight (in total) of two or more different tackifiers having different softening points; and
(E) 10 to 40% by weight of a plasticizer, which are blended and provided as main component. Besides, it is preferable that the hot-melt type adhesive composition contains, among these two or more different tackifiers having different softening points, at least one of the tackifiers having softening points of 60 to 100° C. measured in accordance with JIS K 2207.

This is because such a hot-melt type adhesive composition allows the adhesive strength thereof to a SBR plate at different temperatures to be controlled easily. Thus, if it is used in the tire adhesive sheet even at low outside temperatures in winter or even when a studless tire is used as a substrate, the adhesive sheet can be adhered precisely with little loosening or falling off (detachment). In addition, another reason is that a manufacturing device can be miniaturized and a manufacturing time can be reduced because, even at high outside temperatures in summer, there is no trouble of loosening and detachment after adhering and also there is no need of using a solvent or drying upon adhering of the adhesive layer.

Furthermore, the amount of the block copolymer added may be preferably in the range of 15 to 40% by weight with respect to the whole amount of the hot-melt type adhesive composition.

This is because, when the amount of the block copolymer becomes below 15% by weight, a decrease in cohesive strength of the whole adhesive may occur and also a significant decrease in characteristics and leaking out of the cross section of the adhesive tape (hereinafter, referred to as "ooze") may occur at high temperatures in summer, and furthermore running short of the adhesive may be worsened during the process of punching out.

On the other hand, another reason in that, when the amount of the block copolymer added exceeds 40% by weight, the adhesive strength to a SBR plate may decrease. It may result in fail of strong adhesion and difficulty in adhering under a low temperature environment. Also, when the block copolymer added exceeds 40% by weight, melt viscosity of the whole adhesive rises, so that the problem of a decrease in hot-melt coating fitness may occur.

Therefore, more preferably, the amount of the block copolymer added may be in the range of 18 to 30% by weight with respect to the whole amount of the hot-melt type adhesive composition.

Furthermore, to the block copolymer, it is preferable to add a diblock copolymer, which is the AB-type block copolymer in conjunction with the use of an ABA-type triblock copolymer. In other words, the amount of the diblock copolymer added may be preferably in the range of 30 to 80% by weight with respect to 100% by weight of the block copolymer.

This is because, if the amount of the diblock copolymer added becomes below 30% by weight, the adhesive sheet may tend to loose or fell off from the tire due to an insufficient adhesive strength to a SBR plate at low temperatures. On the other hand, if the amount of the diblock copolymer added exceeds 80% by weight, ooze or adhesive deposit may tend to occur after peeling the label off.

Furthermore, if the ABA-type block copolymer is a styrene/isoprene/styrene block copolymer (SIS), as the AB-type block copolymer, it is preferable to use a styrene/isoprene block copolymer (SI) of the same sort.

For the block copolymer, furthermore, the content of the polystyrene domain in 100% by weight of the block copolymer may be preferably 20% by weight or less.

This is because, if the content of the polystyrene domain exceeds 20% by weight, isoprene that substantially contribute to the expression of adhesion strength may be comparatively insufficient, thereby causing a decrease in adhesive strength to a SBR plate. Therefore, the adhesive sheet cannot be strongly stuck on the tire, so that it may be difficult in adhering particularly under a low temperature environment. Furthermore, there is a case in which the melt viscosity of the whole adhesive may increase, thereby causing the problem of a decrease in hot-melt coating ability.

However, an excess decrease in content of the polystyrene domain may tend to generate ooze or adhesive deposit. Therefore, it is preferable that the content of the polystyrene domain in 100% by weight of the block copolymer may be in the range of 10 to 20% by weight.

(1)-2 Tackifier

For constructing the hot-melt type adhesive composition, it is preferable to add any tackifier to the composition. Here, as a kind of the tackifier, but not specifically limited to, at least one of rosin-based resins such as a polymerized rosin, polymerized rosin ester, and a rosin derivative; a polyterpene resin, an aromatic denatured terpene resin and a hydride thereof, a terpene phenol resin, a cumarone-indene resin, an aliphatic petroleum resin, an aromatic petroleum resin and a hydride thereof, an aliphatic/aromatic copolymer petroleum resin, and a low molecular weight combination of styrene or substituted styrene can be exemplified.

In addition, in terms of two or more tackifiers having different softening points, the reason of including plural tackifiers is that any tackifier resin containing two or more tackifiers and having a comparatively high softening point is effective to express tackiness at high temperatures but losses its tackiness at low temperatures. Therefore, by using together with a tackifier having a comparatively low softening point, it is able to cope with a wide temperature range from low to high temperatures. In other words, the reason is that two or more tackifiers having different softening points are selectively compatibilized with each of rubber and resin constituents in the block copolymer.

Furthermore, among them, the reason of including at least one tackifier having a softening point of 120° C. or more is that the inclusion of plural tackifiers having specific softening points are effective to exert their respective tackiness at high temperatures. Therefore, at a wide temperature range, the adhesive strength to a SBR plate and the cohesive strength of the hot-melt type adhesive composition can be easily controlled.

By the way, the tackifier having a softening point of 120° C. or more may be preferably polymerized rosin ester. This is because the adhesion strength to a SBR plate, the cohesive adhesion, and the ability of adhering on the rounded surface of the hot-melt type adhesive composition at a wide temperature range can be more easily controlled.

Furthermore, for other tackifier having a different softening point may preferably have a softening point of 60 to 100° C., measured in accordance with JIS K 2207 (ring and ball method). More preferable is a tackifier having a softening point of 70 to 90° C.

This is because of a specific increase in tackiness at lower and normal temperatures when a tackifier having a softening point of 60 to 100° C. is used together.

By the way, the other tackifier having a different softening point may be preferably one having a softening point 30° C. or more lower than one having a softening point of 120° C. or more. This is because the use of such a tackifier allows a further improvement in tackiness at lower and normal temperatures.

On the other hand, with respect to a combination of two or more different tackifiers having different softening points, for example, any combination of an aromatic denatured terpene resin, terpene phenol resin, aliphatic petroleum resin, aromatic petroleum resin, and aliphatic/aromatic copolymer petroleum resin tends to be selectively compatibilized with a resin portion in the block copolymer, while a polymerized rosin resin tends to be selectively compatibilized with a rubber portion. Therefore, it is a combination of favorable tackifiers.

In particular, as shown in FIGS. 2 and 3, when a combination of the aliphatic/aromatic copolymer petroleum resin (e.g., T-480 X) and the polymerized rosin ester (e.g., D-160) is used as a tackifier, it has been revealed that the adhesive strength to a SBR plate at 5° C. or 40° C., the ability of adhering on the round surface, and the retention can be changed only by changing the amount of the polymerized rosin ester added (in the range of 0 to 18% by weight) (Variation range of adhesive strength at 5° C.: 2.4 to 11.8 N/25 mm, variation range of adhesive strength at 40° C.: 6.0 to 12.4 N/25 mm, variation of ability of adhering on the rounded surface: 0 to 12 mm, and variation of retention force: 800 to 25,000 seconds). Here, the method described in Example 1 can be applied for the measurements of adhesive strength to a SBR plate at 5° C. or 40° C., the ability of adhering on the round surface, and the retention, respectively.

Therefore, for a combination of: two or more different tackifiers having different softening points, the use of a combination of: at least one selected from the group consisting of an aromatic denatured terpene resin, a terpene phenol resin, an aliphatic petroleum resin, an aromatic petroleum resin, an aliphatic/aromatic copolymer petroleum resin, and rosin resin except of polymerized rosin ester; and polymerized rosin ester is able to exert excellent characteristics in both the adhesive strength and the ability of adhering on the rounded surface of the hot-melt type adhesive composition.

In the case of using the combination of: any of an aromatic denatured terpene resin, a terpene phenol resin, an aliphatic petroleum resin, an aliphatic petroleum resin, and an aliphatic/aromatic copolymer petroleum resin; and polymerized rosin ester, it is preferable that the amount of the polymerized rosin ester added is in the range of 5 to 25% by weight with respect to the total amount of plural tackifiers (100% by weight).

This is because, if the amount of the polymerized rosin ester is below 5% by weight, a significant decrease in evaluation of adhesive strength to a SBR plate at 40° C. and ability of Adhering on the rounded surface may occur. In addition, if the amount of the polymerized rosin ester exceeds 25% by weight, a significant decrease in evaluation of adhesive strength to a SBR plate at 5° C. may occur.

Therefore, it is more preferable that the amount of the polymerized rosin ester added may be in the range of 10 to 25% by weight with respect to the total amount of plural tackifiers.

In addition, the total amount of two or more tackifiers added having different softening points may be preferably in the range of 30 to 70% by weight with respect to the whole amount of the hot-melt type adhesive composition.

This is because, if the total amount of tackifiers added is below than 30% by weight, the adhesion strength of the adhesive sheet becomes insufficient and thus the adhesive sheet may not be strongly stuck on the tire. On the other hand, if the total amount of the tackifiers added exceeds 70% by weight, running short of the adhesive may be worsened upon ooze or the process of punching out. Furthermore, the total amount of the tackifiers added may be more preferably in the range of 40 to 65% by weight with respect to the whole amount of the hot-melt type adhesive composition.

(1)-3 Plasticizer

For formulating the hot-melt type adhesive composition, the addition of any plasticizer is preferable. Here, for example, the kind of the plasticizer may be, but not specifically limited to, a petroleum process oil such as a paraffin-based oil, a naphthene-based process oil, or an aromatic process oil; a natural oil such as a castor oil or a tall oil; dibasic dialkyl such as dibutyl phthalate, dioctyl phthalate, or dibutyl adipate; or a low-molecular weight liquid polymer such as liquid polybutene or a liquid polyisoprene.

Among them, when the paraffin-based process oil is used, a hot-melt type adhesive composition having an excellent color hue while being stable against heat and UV can be obtained. Therefore, it can be a preferable plasticizer.

Furthermore, it is also possible to use both the paraffin-based process oil and other plasticizers together with each other in combination with another plasticizer. In this case, it is preferable that the paraffin-based process oil may be preferably 60% by weight or over with respect to the whole amount (100% by weight) of the plasticizer.

In addition, it is also preferable that the amount of plasticizer may be preferably in the range of 10 to 40% by weight with respect to the whole amount of the hot-melt type adhesive composition.

This is because, when the amount of the plasticizer added is below 10% by weight, a sufficient plasticization cannot be attained and thus the adhesive strength to a SBR plate may become insufficient, thereby resulting in insufficient adhesion upon adhering the adhesive sheet on a tire. On the other hand, when the amount of the plasticizer added exceeds 40% by weight, running short of the adhesive may be worsened upon ooze or the process of punching out.

Furthermore, it is more preferable that the amount of the plasticizer added may be in the range of 15 to 30% by weight with respect to the whole amount of the hot-melt type adhesive composition.

(1)-4 Additive Agent

The hot-melt type adhesive composition of the present invention may be added with, if required, any of various conventional additive agents, such as fillers, inorganic and organic particles, lightweighting agents, plasticizers, pigments, dyes, coloring agents, oxidation inhibitors, UV absorbers, and light stabilizers.

3. Adhesive Strength

For constructing the tire adhesive sheet, the adhesive strength to a SBR plate at 5° C. (A) is controlled within a predetermined range because the adhesive sheet shows a high adhesive strength to a tire even at low temperatures in winter and is closely related with no loose or falling off occurred after adhering on.

In other words, as the adhesive strength to a SBR plate at 5° C. is 7 N/25 mm or more, the tire adhesive sheet can be stuck on a tire even at a temperature of about 5° C. and also strongly stuck even on a tire having comparatively low adhesion strength, such as a studless tire. In contrast, if the adhesive strength to a SBR plate at 5° C. is below 7N/25 mm, the label may tend to loose or fall off from the tire.

However, if the adhesive strength to a SBR plate at 5° C. is extremely high, adhesive deposit may tend to occur after peeling the label off.

Therefore, the adhesive strength to a SBR plate at 5° C. (A) is more preferably in the range of 7 to 30 N/25 mm, further preferably in the range of 7 to 15 N/25 mm.

On the other hand, the adhesive strength to a SBR plate at 40° C. (B) is controlled within a predetermined level because the adhesive sheet shows a sufficient adhesive strength to a tire even at high temperatures in summer and is closely related with no loose or falling off occurred after adhering on.

In other words, as the adhesive strength to a SBR plate at 40° C. is 7 N/25 mm or more, the adhesive sheet may retain a sufficient adhesive strength to a tire even at high temperatures, thereby effectively preventing the adhesive sheet from loosing or falling off upon storage or in shipment of the tire. On the other hand, if the adhesive strength to a SBR plate to 40° C. is below 7 N/25 mm, the tire adhesive sheet once stuck on a tire may loose or fall off upon storage or in shipment.

However, if the adhesive strength to a SBR plate at 40° C. is extremely high, adhesive deposit may occur upon peeling off the adhesive sheet from the tire. Therefore, the adhesive strength to a SBR plate at 40° C. (B) is more preferably in the range of 7 to 30 N/25 mm, further preferably in the range of 7 to 15 N/25 mm.

As described above, it is important to simultaneously control both the adhesive strength to a SBR plate at 5° C. (A) and the adhesive strength to a SBR plate at 40° C. (B) of the hot-melt type adhesive composition. If one of them does not satisfy the adhesion characteristics thereof, any problem may occur when the tire adhesive sheet is used in practice. In other words, by satisfying the above conditions (A) and (B), it becomes possible to select any tire adhesive sheet which can be available at a wide temperature range.

4. Ability of Adhering on Rounded Surface

Furthermore, for constructing the tire adhesive sheet, with respect to its ability of adhering on any rounded surface, it is preferable that the tire adhesive sheet may adhere on a round bar made of polyethylene (10 mm in diameter) and then left standing for 7 days under standard conditions (23° C.±2° C. at temperature and 50%±5% in relative humidity) to attain a total loose length of below 5 mm.

This is because, if the total loose length exceeds 5 mm, after adhering on a tire, the adhesive sheet may tend to loose or fall off.

5. Retention Force

For constructing the tire adhesive sheet, a hot-melt type adhesive composition that constitutes an adhesive layer may preferably have a retention force of within the range of 1,000 to 20,000 seconds when measured in accordance with JIS Z 0237.

This is because, if the retention force is below 1,000 seconds, running short of the adhesive may be worsened upon ooze or the process of punching out. On the other hand, if the retention force exceeds 20,000 seconds, after adhering the adhesive sheet on a tire, a decrease in wettability of an adhesive agent against the substrate may occur at low temperatures and tend to make the adhesive sheet loosing or falling off.

Therefore, the retention force of the hot-melt type adhesive composition is more preferably in the range of 2,000 to 18,000 seconds.

6. Manufacturing Method

As a method of manufacturing a tire adhesive sheet according to the present invention, for instance, there is one in which, when an adhesive layer containing a hot-melt type adhesive composition on a base material, an adhesive layer is coated with a hot-melt type adhesive composition that satisfies both the adhesion characteristics of:

(A) an adhesive strength of 7 N/25 mm or more with respect to a SBR plate at 5° C.; and (B) an adhesive strength of 7 N/25 mm or more with respect to a SBR plate at 40° C.

The method of manufacturing a tire-adhesive sheet by forming an adhesive layer from a hot-melt type adhesive composition may be preferably, but not specifically limited to, for example a method that employs a transfer-coating process that includes the steps of coating a release sheet with a hot-melt type adhesive composition on a release sheet and optionally drying the release sheet and then laminating the release sheet on a surface base material.

Alternatively, it is also preferable to employ a direct coating process that includes the steps of directly applying a hot-melt type adhesive composition on a surface base material at fast and optionally drying and then laminating a release sheet on the surface base material.

Furthermore, as a coating device for the hot-melt type adhesive composition, any of coating devices known in the art, such as a roll coater, a knife coater, a bar coater, a die coater, an air-knife coater, a gravure coater, a vario-gravure coater, and a curtain coater, may be used for the coating.

Furthermore, the coating weight of the hot-melt type adhesive composition may be preferably in the range of 20 to 120 g/m² in dry weight. This is because, if the coating weight thereof is below 20 g/m², the tackiness of the adhesive sheet to a tire may be insufficient. On the other hand, if it exceeds 120 g/m², there may be an increase in possibility of causing not only ooze but also any trouble upon printing or during the process of punching out.

Furthermore, the coating weight of the hot-melt type adhesive composition may be more preferably in the range of 30 to 80 g/m².

By the way, due to the properties of the adhesive agent composition that mainly comprises the ABA-type block copolymer of the present invention, such a composition may be directly molded and used as a hot-melt type adhesive composition. Therefore, the hot-melt type adhesive composition formed into a predetermined configuration can be heat-melted once using the conventionally known applicator and the coated composition in a solution state was then applied and solidified so as to be provided as an adhesive layer.

In this regard, generally, the tire adhesive sheet having a high coating weight is often used as, for example, one having a thickness of 60 g/m². Thus, there is the possibility of which a solvent-type adhesive agent may become a rate-limiting factor for the production rate in a drying process. On the other hand, a dramatic increase in rate of coating can be attained by using another hot-melt type adhesive composition which doe not require any drying process, thereby making cost reduction possible in production. Furthermore, the use of the hot-melt type adhesive composition permits the use of no solvent or the use of a solvent at an amount being reduced as possible, thereby providing a large merit from the viewpoint of not only an economical side but also environmental protection.

EXAMPLES

Example 1

1. Manufacturing of Tire Adhesive Sheet

A hot-melt type adhesive composition formulated as shown in Table 1 was prepared by uniformly mixing: 20.8% by weight of Kraton D-1112 (SIS, diblock content: 40% by weight, styrene domain content: 15% by weight, manufactured by Kraton Polymer Japan Co., Ltd., hereinafter referred to as "D-1112"); 44.5% by weight of T-480X (softening point: 80° C., aliphatic/aromatic copolymer petroleum resin, manufactured by Mitsui Chemicals, Inc.) and 12.9% by weight of Vencer D-125 (softening point: 125° C., polymerized rosin ester, manufactured by Arakawa Chemical Industries, Ltd., hereinafter, referred to as "D-125") as tackifiers; 20.8% by weight of Pureflex SNH-100SP (paraffin-based oil process, manufactured by Sankyo Yuka Kogyo K.K., hereinafter referred to as "SNH-100SP") as a plasticizer; and 1% by weight of Irganox 1010 (hindered phenol antioxidant, manufactured by Chiba Specialty Chemicals, Co., Ltd.) as an antioxidant.

Next, the hot-melt type adhesive composition thus obtained was molten at 140° C. and then applied on a release sheet (silicone resin/polyethylene film/premium grade paper, trade name "SP-8EA Ivory", manufactured by Lintec Corporation) using a die coater so as to have a coating weight of 50 g/m² to form an adhesive layer.

Subsequently, the aluminum-deposited layer surface of a white coat polyethylene terephthalate film having an aluminum deposited layer (1 µm white coat (containing ethylene-vinyl acetate resin and titanium oxide)/12 µm polyethylene terephthalate film/aluminum deposited layer) was laminated on the adhesive layer of the release sheet, thereby producing a tire adhesive sheet having the release sheet.

2. Evaluation (1) Adhesive Strength

The resulting tire adhesive sheet was peeled off using an Instron type tension-testing machine at a pulling rate of 300 mm/min at an angle of 180° in accordance with JIS Z 0237 and a tension load was then measured. The tension loads obtained under environmental conditions of 5° C. and 40° C. were determined as adhesive strengths (N/25 mm) at 5° C. and 40° C., respectively.

Furthermore, a SBR plate of 2 mm in thickness (manufactured by Irumagawa Rubber Co., Ltd.) was used for the measurement of adhesive strength. The results obtained are shown in Table 1.

(2) Retention Force

The resulting tire adhesive sheet was stuck on a stainless plate of 2 mm in thickness and the falling time of an 1-kg weight was then measured under the conditions of a measuring temperature of 40° C., a load of 9.8 N, and a laminating area of 25 mm×25 mm (measuring method in accordance with JIS Z 0237). The results obtained are shown in Table 1.

(3) Ability of Adhering on Round Surface

Figure 1:
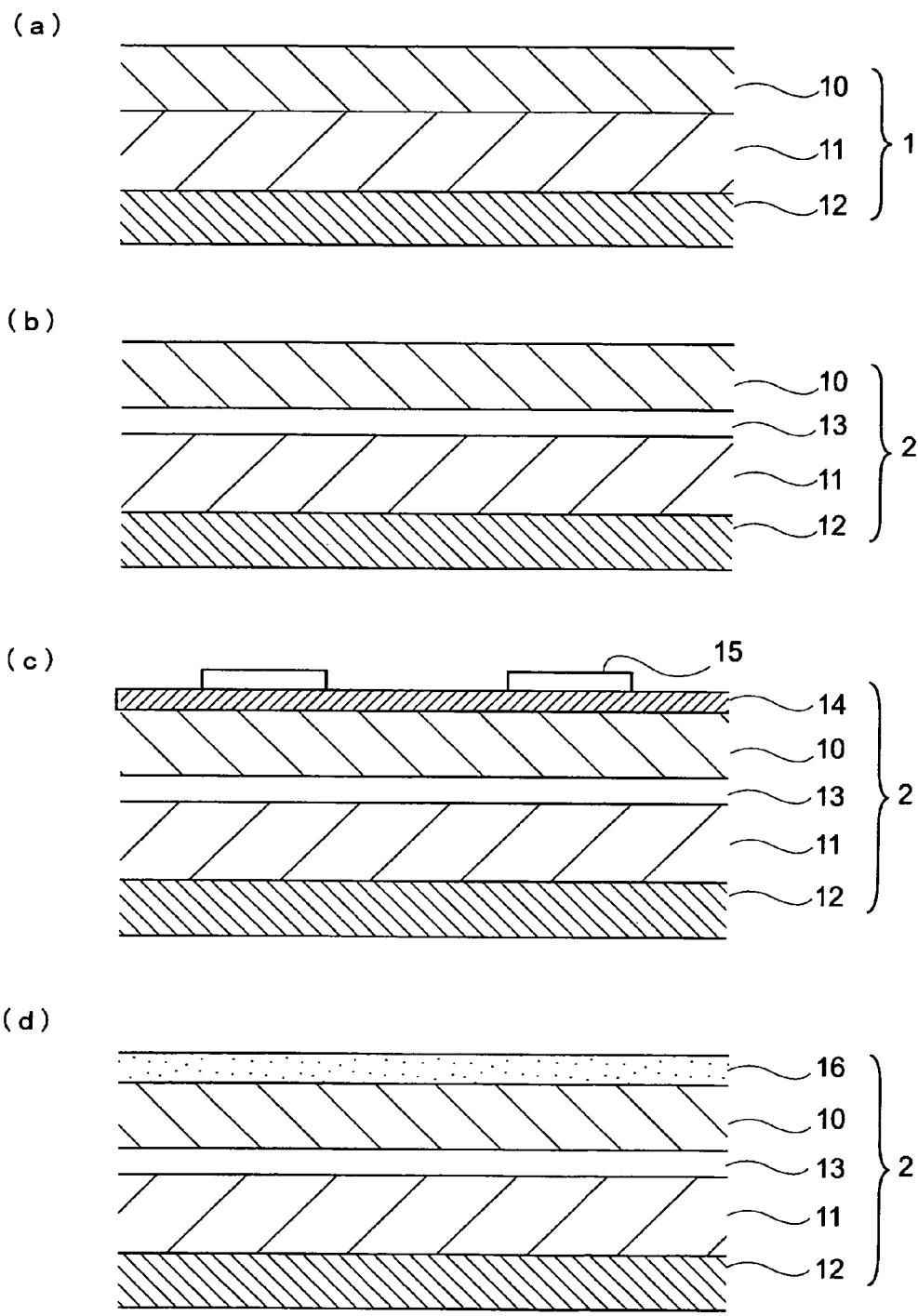
FIGS. 1(a) to (d) represent schematic cross-sectional diagrams provided for illustrating the configurations of the tire adhesive sheets, respectively.
Figure 2:
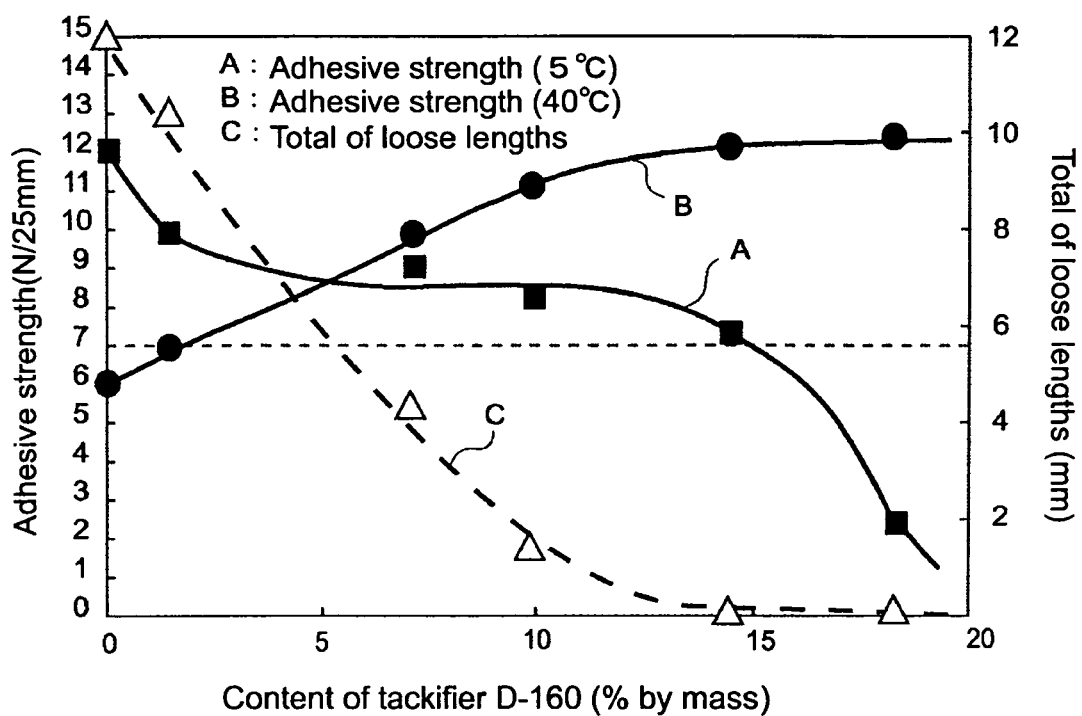
FIG. 2 is a graphical representation that illustrates the influence of the amount of a tackifier D-160 added (Part 1).
Figure 3:
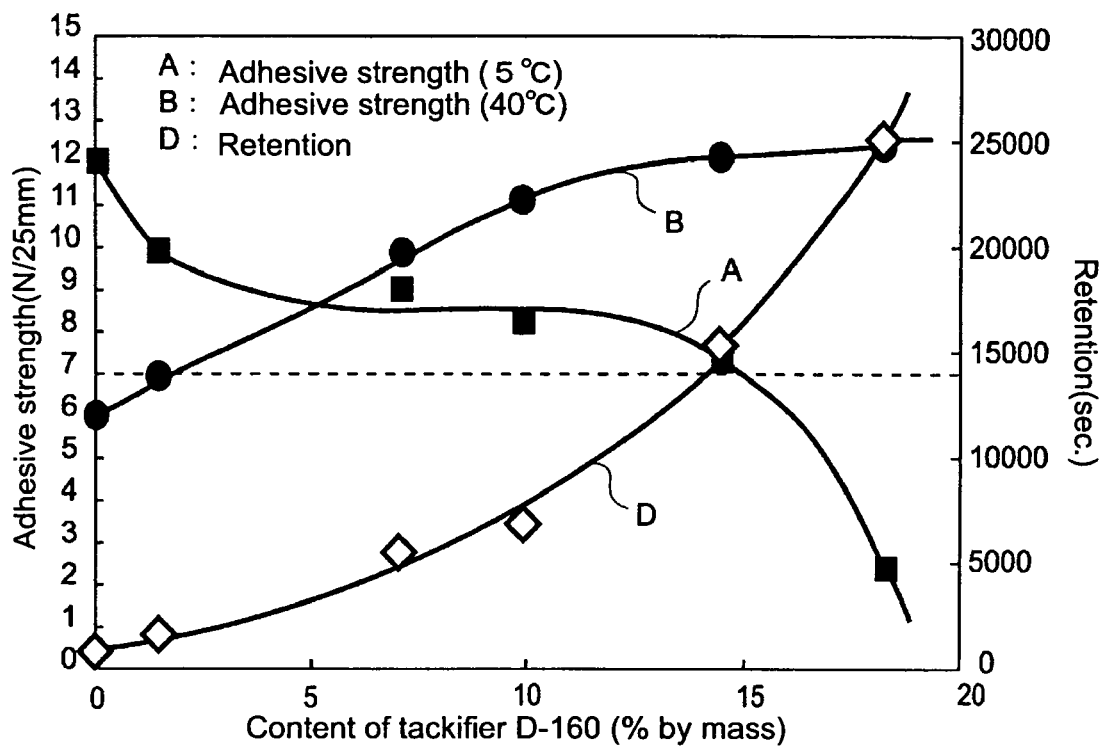
FIG. 3 is a graphical representation that illustrates the influence of the amount of a tackifier D-160 added (Part 2).
Figure 4:
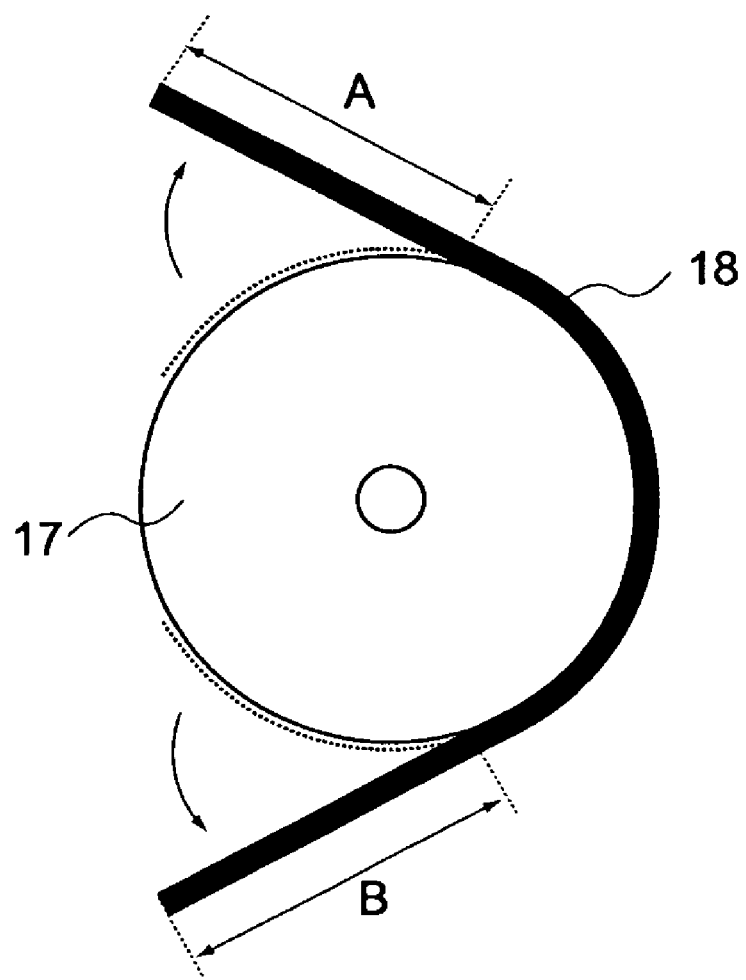
FIG. 4 is a schematic diagram provided for illustrating the ability of adhering on the rounded surface.

From the obtained tire adhesive sheet, a small piece of 25 mm in width and 22 mm in length was cut out and stuck on a polyethylene round bar of 10 mm in diameter (manufactured by Engineering Test Service, Co., Ltd.), and then left standing for seven days under standard conditions (23° C.±2° C. at temperature and 50%±5% in relative humidity). After that, as shown in FIG. 4, the lengths of respective loose portions of the small piece 18 from the mandrel bar 17 (A and B) were measured. The total of the loose lengths (A+B) for each case was obtained. The measurement was repeated twice and an average thereof was then employed. The results obtained are shown in Table 1.

(4) Peel Strength

From the obtained tire adhesive sheet, a small piece of 20 cm in width and 10 cm in length was cut out and stuck on a studless tire (MZ-03, manufactured by Bridgestone Corporation) in each of environments at 5° C. and 40° C., and then left standing for 72 hours in such environments. The peel strength of the small piece was measured by peeling it off by hand and the peel strength of the tire adhesive sheet was then evaluated on the basis of the criteria described below. The results obtained are shown in Table 1.

Evaluation Criteria:

++: The adhesive sheet has a sufficient adhesive strength.

+: The adhesive sheet has a comparative low adhesive strength but practically no trouble at all.

±: The adhesive sheet has a poor adhesive strength and easily peeled off.

−: The adhesive sheet has no adhesive strength.

(5) Test for Peeling Ability

From the obtained tire adhesive sheet, a small piece of 20 cm in width and 10 cm in length was cut out and stuck on a studless tire (MZ-03, manufactured by Bridgestone Corporation) in each of environments at 5° C. and 40° C., and then left standing for 72 hours in such environments. Subsequently, the adhering state of the small piece was observed the naked eye and then evaluated on the basis of the criteria described below. The results obtained are shown in Table 1.

Evaluation Criteria:

++: No peeling and loose were not observed at all on the tire adhesive sheet.

+: Slight peeling and loose were observed on the tire adhesive sheet (but practically no trouble at all).

±: Peeling and loose were observed here and there on the tire adhesive sheet (practically considerable).

−: Peeling and loose were observed markedly on the tire adhesive sheet (practically considerable).

(6) Test for Storage (Peeling Ability)

From the obtained tire adhesive sheet, a small piece of 20 cm in width and 10 cm in length was cut out and stuck on a studless tire (MZ-03, manufactured by Bridgestone Corporation) in an environment at 23° C., 50% RH, and then left standing for 10 days at 60° C. Subsequently, the adhering state of the small piece was observed the naked eye and then evaluated on the basis of the criteria described below. The results obtained are shown in Table 1.

Evaluation Criteria:

++: No peeling and loose were not observed at all on the tire adhesive sheet.

+: Slight peeling and loose were observed on the tire adhesive sheet (but practically no trouble at all).

±: Peeling and loose were observed here and there on the tire adhesive sheet (practically considerable).

−: Peeling and loose were observed markedly on the tire adhesive sheet (practically considerable).

Examples 2 to 5

In each of Examples 2 to 5, the hot-melt type adhesive composition formulated as shown in Table 1 was coated on the release sheet described above so as to be 50 g/m² in coating weight by using a die coater just as in the case of Example 1. Next, it was laminated on a white polyethylene terephthalate film having an aluminum deposited layer to produce a tire adhesive sheet having the release sheet, followed by the same evaluation as in Example 1.

Furthermore, in addition to the materials used in Example 1, the formulation of the hot-melt type adhesive composition further employed Kraton D-1113 (SIS, diblock content: 55% by weight, styrene domain content: 16% by weight, manufactured by Kraton Polymer Japan Co., Ltd., hereinafter referred to as "D-1113") and Vencer D-160 (softening point: 150° C. or more, polymerized rosin ester, manufactured by Arakawa Chemical Industries, Ltd., hereinafter referred to as "D-160"). The results obtained are shown in Table 1.

Comparative Examples 1 to 5

In each of Comparative Examples 1 to 5, the hot-melt type adhesive composition formulated as shown in Table 2 was coated on the release sheet described above so as to be 50 g/m² in coating weight by using a die coater just as in the case of Example 1. Next, it was laminated on a white polyethylene terephthalate film having an aluminum deposited layer to produce a tire adhesive sheet having the release sheet, followed by the same evaluation as in Example 1.

Here, in addition to the materials used in the formulations of the hot-melt type adhesive compositions in examples and comparative examples, Kraton D-1107 (SIS, diblock content: 15% by weight, styrene domain content: 15% by weight, manufactured by Kraton Polymer Japan Co., Ltd., hereinafter referred to as "D-1107"), Kraton D-1124 (SIS, diblock content: 30% by weight, styrene domain content: 30% by weight, manufactured by Kraton Polymer Japan Co., Ltd., hereinafter referred to as "D-1124"), and Eastotack C15R (softening point: 115° C., hydrogenerated aliphatic petroleum polymerized resin, manufactured by Eastman Chemicals, Co., Ltd., hereinafter referred to as "C-115R"). The results obtained are shown in Table 1.

Furthermore, in Comparative Example 1, as a tackifier, several tackifiers including polymerized rosin ester were employed. However, since the softening points of tackifiers used in combination were high, the adhesive strength to a SBR plate at 5° C. was too low. Therefore, significant loose and peeling upon storage at low temperatures were observed.

Furthermore, in Comparative Example 2, as a tackifier, one kind of the petroleum resin was employed. Thus, the adhesive sheet had a low adhesive strength to a SBR plate at 40° C. As a result, significant loose and peeling upon storage at high and low temperatures were observed. In addition, it was also observed that the adhesive sheet tended to have an inferior ability of adhering on the rounded surface.

Furthermore, in Comparative Example 3, as a tackifier, several tackifiers including polymerized rosin ester were employed. However, it was considered that the amount of diblock in SIS was low. Thus, the adhesive sheet showed an extremely low adhesive strength to a SBR plate at 5° C., so that significant loose and peeling upon storage at low temperatures could be observed.

Furthermore, in Comparative Example 4, as a tackifier, several tackifiers including polymerized rosin ester were employed. However, it was considered that the content of styrene domain in SIS was high. Thus, the adhesive sheet showed an impossibly low adhesive strength to a SBR plate at 5° C., so that significant loose and peeling upon storage at low temperatures could be observed.

TABLE 1

| | | Trade name, etc. | Example 1 | Example 2 | Example 3 | Example 4 | Example 5 |
|---|---|---|---|---|---|---|---|
| Formulation | Block copolymer (% by mass) | D-1112 | 20.8 | 21.2 | 21.8 | — | 9.9 |
| | | D-1113 | — | — | — | 20.8 | 11.9 |
| | Tackifier (% by mass) | T-480X | 44.5 | 46.5 | 48.5 | 44.1 | 46.5 |
| | | D-125 | 12.9 | — | 6.9 | 13.3 | — |
| | | D-160 | — | 10.1 | — | — | 10.4 |
| | Plasticizer (% by mass) | SNH-100SP | 20.8 | 21.2 | 21.8 | 20.8 | 20.3 |
| | Antioxidant (% by mass) | Irgnox1010 | 1.0 | 1.0 | 1.0 | 1.0 | 1.0 |
| Evaluation | Adhesive strength (N/25 mm) | 5° C. | 12.1 | 8.4 | 12.4 | 13.0 | 9.5 |
| | | 40° C. | 10.4 | 11.3 | 10.5 | 9.5 | 12.0 |
| | Retention (second) | | 6000 | 7000 | 3000 | 2500 | 4000 |
| | Total of loose lengths (mm) | | 2.5 | 0.5 | 4.5 | 3.5 | 1.0 |
| | Peel strength | 5° C. | ++ | + | ++ | + | + |
| | | 40° C. | + | ++ | + | + | + |
| | peeling ability | 50° C. | ++ | + | + | + | ++ |
| | | 40° C. | + | + | + | + | ++ |
| | | storage (60° C.) | + | ++ | + | + | ++ |

TABLE 2

| | | Trade name, etc. | Comparative Example 1 | Comparative Example 2 | Comparative Example 3 | Comparative Example 4 |
|---|---|---|---|---|---|---|
| Formulation | Block copolymer (% by mass) | D-1112 | 20.8 | 20.8 | — | — |
| | | D-1107 | — | — | 20.8 | — |
| | | D-1124 | — | — | — | 20.8 |
| | Tackifier (% by mass) | T-480X | — | 57.4 | 44.5 | 44.5 |
| | | D-125 | 12.9 | — | 12.9 | 12.9 |
| | | C-115R | 44.5 | — | — | — |
| | Plasticizer (% by mass) | SNH-100SP | 20.8 | 20.8 | 20.8 | 20.8 |
| | Antioxidant (% by mass) | Irgnox1010 | 1.0 | 1.0 | 1.0 | 1.0 |
| Evaluation | Adhesive strength (N/25 mm) | 5° C. | 3.1 | 12.1 | 5.7 | 2.0 |
| | | 40° C. | 13.1 | 6.8 | 9.2 | 9.0 |
| | Retention (second) | | 12500 | 800 | 14000 | 20500 |
| | Total of loose lengths (mm) | | 2.5 | >12 | 2.0 | 3.5 |
| | Peel strength | 5° C. | − | ± | − | − |
| | | 40° C. | ± | + | + | + |
| | peeling ability | 5° C. | − | ± | − | − |
| | | 40° C. | ± | − | + | + |
| | | storage (60° C.) | + | − | + | ++ |

Examples 6 to 8 and Comparative Examples 5 to 7

In each of Examples 6 to 8 and Comparative Examples 5 to 7, the hot-melt type adhesive composition was coated on the release sheet described above so as to be 50 g/m² in coating weight by using a die coater just as in the case of Example 1, excepting that the content of tackifier D-160 was varied and formulated in the composition as shown in Table 3. Next, it was laminated on a white polyethylene terephthalate film having an aluminum deposited layer to produce a tire adhesive sheet having the release sheet, followed by the same evaluation as in Example 1. The results obtained are shown in Table 3.

TABLE 3

| | | Trade name, etc. | Example 6 | Example 7 | Example 8 | Comparative Example 5 | Comparative Example 6 | Comparative Example 7 |
|---|---|---|---|---|---|---|---|---|
| Formulation | Block copolymer (% by mass) | D-1112 | 21.2 | 21.2 | 21.2 | 21.2 | 21.2 | 21.2 |
| | Tackifier (% by mass) | T-480X | 49.6 | 46.6 | 42.6 | 56.6 | 54.6 | 38.6 |
| | | D-160 | 7.0 | 10.0 | 14.0 | — | 2.0 | 18.0 |
| | Plasticizer (% by mass) | SNH-100SP | 21.2 | 21.2 | 21.2 | 21.2 | 21.2 | 21.2 |
| | Antioxidant (% by mass) | Irgnox1010 | 1.0 | 1.0 | 1.0 | 1.0 | 1.0 | 1.0 |
| Evaluation | Adhesive strength (N/25 mm) | 5° C. | 9.0 | 8.4 | 7.3 | 11.8 | 9.8 | 2.4 |
| | | 40° C. | 9.8 | 11.3 | 12.0 | 6.0 | 6.8 | 12.4 |
| | Retention (second) | | 5100 | 7000 | 15000 | 800 | 1800 | 25000 |
| | Total of loose lengths (mm) | | 4.0 | 1.5 | 0.0 | >12 | 10.5 | 0.0 |

TABLE 3-continued

|  | Trade name, etc. | Example 6 | Example 7 | Example 8 | Comparative Example 5 | Comparative Example 6 | Comparative Example 7 |
|---|---|---|---|---|---|---|---|
| Peel strength | 5° C. | ++ | + | + | ± | ± | − |
|  | 40° C. | + | ++ | ++ | + | ± | + |
| peeling ability | 5° C. | + | + | + | ± | + | ± |
|  | 40° C. | + | + | + | − | ± | + |
|  | storage (60° C.) | + | ++ | + | − | ± | ± |

INDUSTRIAL APPLICABILITY

According to the tire adhesive sheet and the manufacturing method thereof of the present invention, it becomes possible to allow a tire adhesive sheet to be precisely stuck on a tire even at low temperatures and also to be strongly stuck even on a studless tire having insufficient adhesion strength by the use of a hot-melt type adhesive composition having specific adhesion characteristics. Therefore, as the tire adhesive sheet has substantially stable characteristics at low and high temperatures, it can be favorably applied on various kinds of tire for automobiles, aircrafts, bicycles, car trucks, and so on. Furthermore, the tire adhesive sheet of the present invention may be favorably applied as a protective or decorative film on various rubber products other than tires and the same effects as those of the present invention can be exerted.

| Explanation of reference sings in Drawings | |
|---|---|
| 1, 2: | tire adhesive sheet, |
| 10: | base material, |
| 11: | adhesive layer, |
| 12: | release film, |
| 13: | metal layer (aluminum deposited layer), |
| 14: | readily-adhesion layer, |
| 15: | print layer, |
| 16: | recording layer, |
| 17: | mandrel bar |
| 18: | small piece. |

We claim:

1. A tire adhesive sheet, comprising:
a base material,
an adhesive layer and
an aluminum deposited layer placed between the base material and the adhesive layer, wherein:
the base material is a polyethylene terephthalate film having a thickness of 10 to 150 μm,
the adhesive layer contains a hot-melt adhesive composition comprising:
15 to 40% by weight of a block copolymer containing a combination of a styrene/isoprene/styrene block copolymer as an ABA block copolymer and a styrene isoprene block copolymer as an AB block copolymer, wherein an amount of the AB block copolymer added is 30 to 55% by weight with respect to the whole amount of the block copolymer,
30 to 70% by weight of a plurality of tackifiers having different softening points, wherein the tackifiers include a combination of at least one tackifier selected from the group consisting of an aromatic denatured terpene resin, a terpene phenol resin, an aliphatic petroleum resin, an aromatic petroleum resin, an aliphatic/aromatic copolymer petroleum resin, and rosin resin except for polymerized rosin ester, and at least one tackifier having a softening point of 60 to 100° C.; and polymerized rosin ester having a softening point of 120° C. or more, said softening points being measured in accordance with JIS K 2207, and a softening point of the tackifier which has said softening point of 60 to 100° C., has a softening point 30° C. or more lower than a softening point of the polymerized rosin ester which has a softening point of 120° C. or more, and the amount of the polymerized rosin ester which has a softening point of 120° C. or more added, is in the range of 5 to 25% by weight with respect to the total amount of plural tackifiers, and
10 to 40% by weight of a plasticizer,
said adhesive layer satisfying adhesion characteristics of:
(A) an adhesive strength of 7 N/25 mm or more with respect to a styrene-butadiene-rubber plate at 5° C.; and
(B) an adhesive strength of 7 N/25 mm or more with respect to the styrene-butadiene-rubber plate at 40° C.

2. The tire adhesive sheet according to claim 1, wherein the tire adhesive sheet has a property such that a total loose length is below 5 mm after the tire adhesive sheet is stuck on a round bar made of polyethylene with 10 mm in diameter and left standing for seven days under standard conditions of 23° C.±2° C. and 50%±5% in relative humidity.

3. The tire adhesive sheet according to claim 1, wherein the retention of the hot-melt adhesive composition is in the range of 1,000 to 20,000 seconds when measured by a measuring method in accordance with JIS Z 0237.

4. The tire adhesive sheet according to claim 1, wherein a content of a polystyrene domain in 100% by weight of the block copolymer is 20% by weight or less.

5. The tire adhesive sheet according to claim 1, wherein the plasticizer is paraffin-based process oil.

* * * * *